United States Patent [19]

Nagata

[11] Patent Number: 4,971,487

[45] Date of Patent: Nov. 20, 1990

[54] METHOD FOR CUTTING INVOLUTE GEARS

[75] Inventor: Shigeyoshi Nagata, Tokyo, Japan

[73] Assignee: Kabushiki Kaisha Technomax Eighty Five, Tokyo, Japan

[21] Appl. No.: 347,728

[22] PCT Filed: Sep. 14, 1987

[86] PCT No.: PCT/JP87/00678

§ 371 Date: Jul. 3, 1989

§ 102(e) Date: Jul. 3, 1989

[87] PCT Pub. No.: WO89/02330

PCT Pub. Date: Mar. 23, 1989

[51] Int. Cl.$^5$ .................................................. B23F 21/16
[52] U.S. Cl. ........................................... 409/12; 407/26
[58] Field of Search ..................... 409/11, 12 X, 13; 407/26 X, 27, 25, 24, 23

[56] References Cited

U.S. PATENT DOCUMENTS

| 3,786,719 | 1/1974 | Kimura et al. | 409/12 |
| 4,184,796 | 1/1980 | Sakai et al. | 409/12 |
| 4,475,319 | 10/1984 | Wiry | 409/12 |

FOREIGN PATENT DOCUMENTS 0044497  4/1977  Japan ................................ 407/23

*Primary Examiner*—Frederick R. Schmidt
*Assistant Examiner*—Blynn Shideler
*Attorney, Agent, or Firm*—William D. Hall

[57] ABSTRACT

A method for simultaneously cutting and chamfering involute gears. The pressure angle $\alpha_1$ and module M of the teeth of a hob for cutting the teeth are selected with respect to the nominal pressure angle $\alpha_0$ and nominal module m of the gear to be cut according to the following equation: $m \cos \alpha_0 = M \cos \alpha_1$. According to the present invention, a single hob cutter is sufficient to cut gears having a wide range of numbers of teeth.

3 Claims, 2 Drawing Sheets

METHOD FOR CUTTING INVOLUTE GEARS

TECHNICAL FIELD

The present invention relates to a method for cutting gears, particularly to a method for cutting an involute gear and simultaneously chamfering its addendum.

BACKGROUND ART

In conventional hob cutters for cutting involute gears having chamfered tooth profiles, the pressure angle exhibited by the rack of teeth on the hob, the "hob tooth profile," is the same as the nominal pressure angle of the gear to be formed. It is also known to reduce the pressure angle on the hob tooth profile to "preshave" the gear tooth profile. In both cases, the relation between the number of teeth on the gear to be cut and the appropriate chamfering value varies monotonously and continuously, such that the rate of such variation is relatively large where the number of teeth is relatively small.

In other words, prior hob cutters have been designed to optimally cut a gear having a particular number of teeth. If a gear having more than this particular number of teeth is cut, the chamfer will be increased. On the other hand, if a gear having fewer teeth than this particular number is cut with the same hob cutter, the chamfer will decrease or disappear.

Accordingly, in the prior art, one of several different hob cutters was selected responsive to the number of teeth on the gear to be cut, in order to appropriately chamfer the teeth of the gear.

SUMMARY OF THE INVENTION

It is an object of the present invention to overcome the above-described disadvantages of the prior art and to provide a single hob cutter for cutting involute gears, whereby a range of gears widely varying in number of teeth can all be chamfered properly.

The above-described object can be achieved by a hob cutter according to the present invention, the hob cutter comprising a cutting edge consisting of a first rack tooth profile portion, for cutting a main tooth profile portion, and a second rack tooth profile portion for chamfering an addendum portion, characterized in that the pressure angle $\alpha_1$ of the first rack tooth profile portion is larger than the pressure angle $\alpha_0$ of the gear to be cut, that the pressure angle $\alpha_2$ of the second rack tooth profile portion is larger than the pressure angle $\alpha_c$ at the pitch circle diameter (PCD) of a second involute portion of the gear, i.e., the chamfer, and that the above-mentioned factors are determined according to the following general formula:

$$m \cos \alpha_0 = M \cos \alpha_1$$

where M is the module of the hob cutter, and m is the module of the gear to be cut.

The angles $\alpha_2$ and $\alpha_c$ are similarly related.

PREFERRED EMBODIMENT OF THE INVENTION

Figure 1:
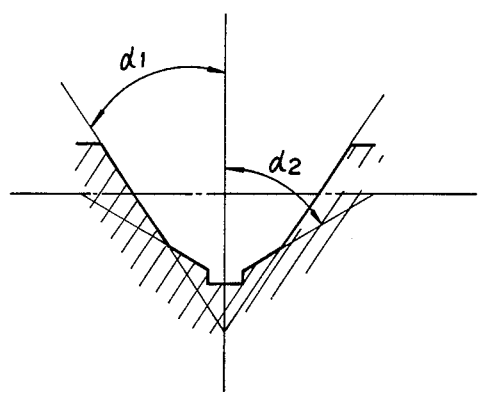
FIG. 1 is a partial enlarged sectional view of one embodiment of a hob cutter for cutting involute gears according to the present invention, showing the structure of the tooth portion.
Figure 2:
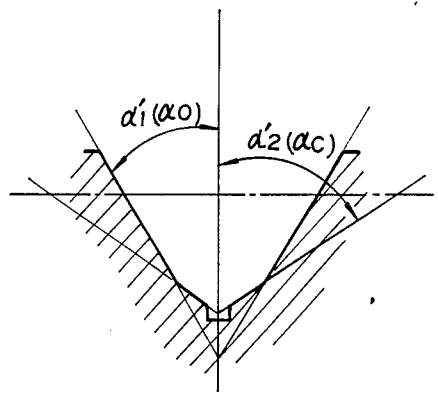
FIG. 2 is a partial enlarged sectional view showing comparable example of prior art hob cutters.

In FIG. 1 and FIG. 2, $\alpha_1$ is the pressure angle of a first rack tooth profile portion of a hob cutter for cutting involute gears according to the present invention, and $\alpha_1'$ is the pressure angle of a first rack tooth profile portion of the prior art hob cutter, which in the prior art was equal to $\alpha_0$, the pressure angle of the gear to be cut. $\alpha_2$ is the pressure angle of a second rack tooth profile portion in the hob cutter according to the present invention, for cutting the chamfer on the teeth of the gear at an angle $\alpha_c$, and $\alpha_2'$ is the pressure angle of the second rack tooth profile portion of the prior art hob cutter, which was equal to $\alpha_c$, the pressure angle of the chamfered portion of the gear.

In the hob cutter for cutting involute gears according to the present invention, the pressure angle $\alpha_1$ of the first rack tooth profile portion of the hob cutter is larger than the pressure angle $\alpha_0$ of the gear to be cut, and similarly, the pressure angle $\alpha_2$ of the second rack tooth profile portion is larger than the pressure angle $\alpha_c$ of the chamfered portion of the gear. These values are determined in accordance with the following general formula:

$$m \cos \alpha_0 = M \cos \alpha_1$$

where M is the module of the hob cutter, and m is the module of the gear to be cut.

$\alpha_2$ and $\alpha_c$ are similarly related according to the modules of the hob and the gear.

As discussed above, prior art hob cutters were formed in such a manner that the pressure angle $\alpha_1'$ of the first rack tooth profile portion was equal to the pressure angle $\alpha_0'$ of the gear to be formed, while $\alpha_2'$ of the second rack tooth profile portion was equal to the desired pressure angle $\alpha_c$ on the pitch circle diameter (PCD) of the second involute curve, that is, the chamfered portion of the gear. Accordingly, the relation between the number of teeth of the gear to be cut and the chamfer values for a particular hob has a low value for gears having a minimum number of teeth, and is then a monotonously increasing function, as shown by Curve B in FIG. 3. This fact prevented the prior art hob cutter to cut the chamfer at the preferred angle $\alpha_c'$ (corresponding to a chamfering value of 0.1, expressed as a function of the module and shown by the horizontal line) unless the number of teeth of the gear to be cut was relatively large. If the prior art hob cutter did not correspond to the number of teeth on the gear to be formed, the chamfer was excessively large or small, or did not exist. Typically, three hobs were required to cut gears having tolerable but non-ideal tooth forms and between 15 and 80 teeth.

Figure 3:
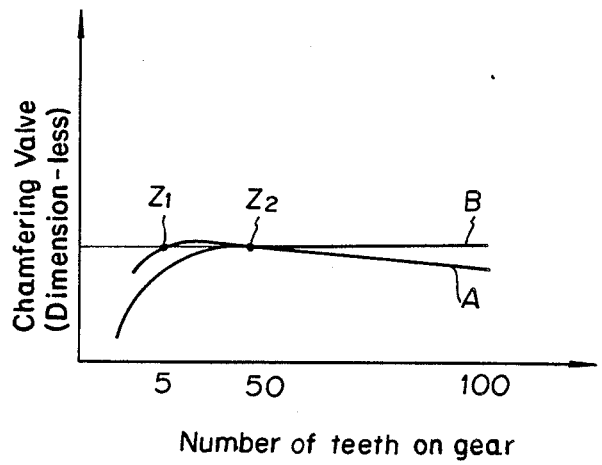
FIG. 3 is a graph showing the relation between the number of teeth on the gear to be cut and the appropriate chamfering values (expressed as a function of the module) of the hob cutter according to the present invention (Curve A), and the corresponding relation between the number of teeth and the chamfering values of the prior art hob cutter (Curve B), respectively.

According to the present invention, however, as described above, the relation between the chamfering values and the number of teeth does not vary greatly from the nominal value of 0.1 of the module (indicated by the horizontal line) as shown by Curve A in FIG. 3, so that a single hob cutter can properly cut and chamfer gears having widely varying numbers of teeth.

Figure 4:
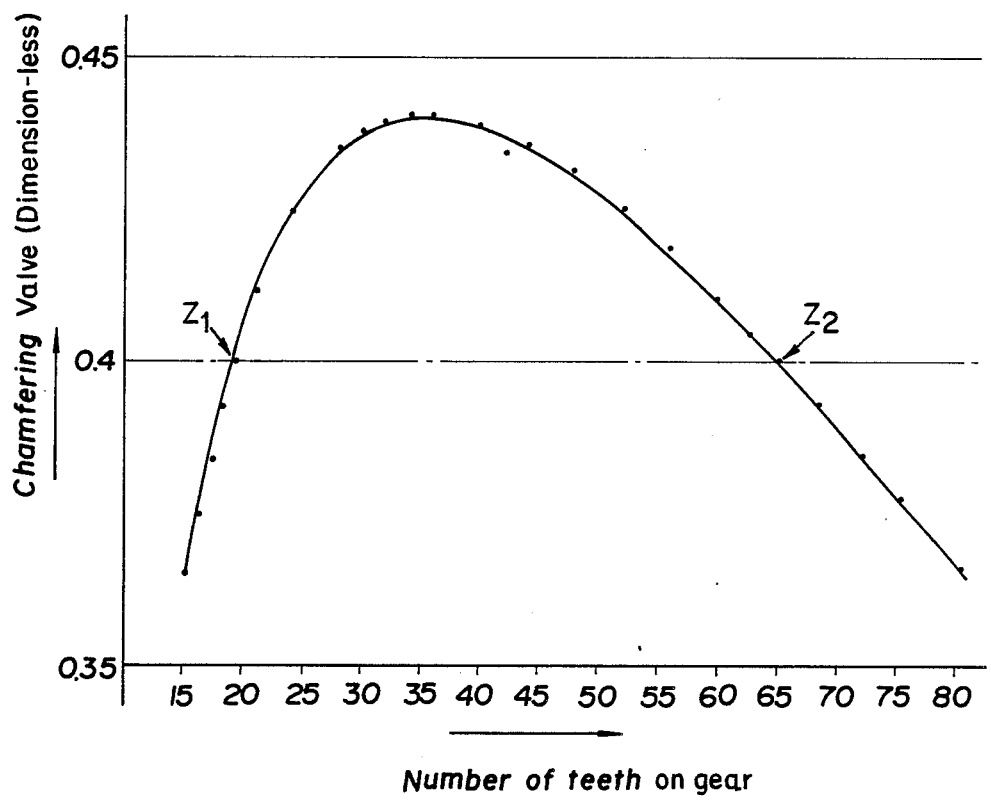
FIG. 4 is a graph showing the relation between the number of teeth and chamfering values of a gear of module m=4, pressure angle $\alpha_0 = 20°$, which is achieved according to the present invention.

FIG. 4 shows the relation between the number of teeth and the chamfering values for a typical gear having module $m=4$ and the pressure angle $\alpha_0=20°$, wherein the ordinate represents the chamfering value, and the abscissa represents the number of teeth. The chamfering value is, again, expressed as a function of the module, so that the 0.4 ideal value for the chamfer for a gear of module $m=4$ is equivalent to the 0.1 value of FIG. 3.

According to the invention, a single hob cutter can chamfer gears having between 15 and 80 teeth, the chamfering values being within ±0.05 mm of the ideal. Such errors are fully tolerable. As shown by intersection of the curve with the 0.4 chamfering line at the points marked $Z_1$ and $Z_2$, when the number of teeth is 19 or 65, the chamfering value corresponds exactly with the standard value of 0.4. This curve thus shows that according to the present invention, a single hob cutter having appropriate module M can be used successfully to cut gears of the corresponding module m and a wide range of numbers of teeth.

INDUSTRIAL APPLICABILITY

When the hob cutter according to the present invention is used to cut a gear, the relation between the chamfering values and the number of teeth is not a monotonously increasing function of the number of teeth on the gear, but increases to a maximal value and than decreases, as shown in FIG. 4; moreover, the optimal chamfering value is obtained for two different numbers of teeth $Z_1$ and $Z_2$. Therefore, the range of the number of teeth which can be cut by means of a single hob cutter is extremely large, and a single hob cutter is sufficient to cut almost all gears.

What is claimed is:

1. A method for cutting an involute gear having a module m and a pressure angle $\alpha_0$, said method comprising the step of: gradually cutting the teeth of the gear to be formed from a gear blank, using a hob of module M and pressure angle $\alpha_1$, wherein the modules of the hob and the gear to be cut and the respective pressure angles are related by the following equation: $m \cos \alpha_0 = M \cos \alpha_1$.

2. The method of claim 1, wherein the teeth of the gear to be cut are to have formed thereon a chamfer defined by an angle $\alpha_c$, the hob having a portion for cutting said chamfer defined by an angle $\alpha_2$, wherein these angles are related by the following equation: $m \cos \alpha_c = M \cos \alpha_2$.

3. The method of claim 1 wherein the number of teeth on the gear which can be cut by a particular hob varies over a range between about 15 and about 80 teeth.

* * * * *